United States Patent [19]

Küepper

[11] 4,095,033

[45] June 13, 1978

[54] PROCESS FOR THE POLYMERIZATION OF CYCLOOLEFINS

[75] Inventor: Friedrich-Wilhelm Küepper, Marl, Germany

[73] Assignee: Chemische Werke Huels Aktiengesellschaft, Marl, Germany

[21] Appl. No.: 777,798

[22] Filed: Mar. 15, 1977

[30] Foreign Application Priority Data

Apr. 1, 1976 Germany .............................. 2613999

[51] Int. Cl.$^2$ ................................................ C08F 4/22
[52] U.S. Cl. ..................................... 526/90; 252/426; 260/33.6 UA; 526/308

[58] Field of Search ........................................... 526/90

[56] References Cited

PUBLICATIONS

J. Polym. Sci., [B] 11, pp. 263–266, (1973).

Primary Examiner—Stanford M. Levin
Attorney, Agent, or Firm—Millen & White

[57] ABSTRACT

Cycloolefins of 8 or 12 carbon atoms and with one or more non-conjugated double bonds in the ring can be polymerized, optionally in the presence of a solvent, with the aid of a catalyst of tungsten hexachloride and cis,trans-1,5-cyclodecadiene as the cocatalyst.

10 Claims, No Drawings

PROCESS FOR THE POLYMERIZATION OF CYCLOOLEFINS

BACKGROUND OF THE INVENTION

The present invention relates to a process for the polymerization of cycloolefins of 8 or 12 carbon atoms having one or more isolated, i.e., non-conjugated, double bonds in the ring, optionally in the presence of a solvent, with the aid of a catalyst consisting of tungsten hexachloride and a cocatalyst.

The production of polyalkenamers from cycloolefins with the aid of metathesis catalysts is conventional, e.g. see G. Dall'Asta in "Makromol. Chem." (Macromolecular Chemistry) 154 : 1–19 (1972). Metathesis catalysts are homogeneous and heterogeneous catalysts containing compounds of metals of subgroups V-VII of the periodic table, primarily those of niobium, tantalum, molybdenum, tungsten and rhenium, as well as optionally compounds of the metals of main groups I-III of the periodic table, e.g., the alkyls or hydrides thereof, if desired with additional ligands, e.g., halogen, alkoxy or carboxylate or, in place thereof, Lewis acids. The metathesis catalysts can also include, as is known, further activating additives, such as alcohols, epoxides, tert.-butyl hypochlorite, peroxides, carboxylic acids, aromatic nitro compounds, vinyl halides, vinyl and allyl ethers and esters, etc.; see for example, DAS (German Published Application) No. 1,072,811; French Pat. Nos. 1,394,380 and 1,467,720; Dutch Pat. Applications Nos. 65-10331, 66-05105, 66-14413, 67-04424, 67-14559, 68-06208, 68-06211 and 68-06209.

Since the customary alkyl or hydride compounds of main groups I-III of the periodic table are both expensive and generally difficult to handle, attempts have been made to conduct metathesis reactions without adding such compounds.

For example, it is known from Italian Pat. 784,307 that a small amount of polymer is obtained after long reaction times by treating cyclopentene with tungsten hexachloride.

Furthermore, a process for the polymerization of various cycloolefins is known from DOS (German Unexamined Laid-Open Application) No. 1,909,226 wherein, inter alia, tungsten hexachloride and an aluminum trihalide are utilized as the catalyst system.

It is furthermore known that 1,5-cyclooctadiene can be converted into polymers with a combination of tungsten hexachloride and phenyl diazomethane, as reported in "Eur. Polym. J.", 10 : 901 (1974).

Finally, it is known from DOS No. 2,332,564 to polymerize 1,5-cyclooctadiene with halides of tungsten, molybdenum, tantalum or rhenium as the catalyst in the presence of certain bicyclo-[2,2,1]-1,5-heptadienes.

All of these processes of the prior art have at least one of the following disadvantages:

1. A low activity of the catalyst system employed and consequently a high amount of catalyst required, leading to high ash contents in the polymers.
2. Poor solubility of the catalyst components and ensuing difficulties in dosing of the catalyst.
3. Low selectivity of polyalkenamer formation by the favoring of undesired secondary reactions.
4. Use of expensive or difficult-to-produce compounds as the cocatalysts.

It is, therefore, an object of this invention to mitigate or overcome the above disadvantages of the processes of the relevant prior art.

Upon further study of the specification and appended claims, further objects and advantages of this invention will become apparent to those skilled in the art.

SUMMARY OF THE INVENTION

Briefly, the above and other objects, features and advantages of the present invention are attained in one aspect thereof by providing a process for the polymerization of a cyloolefin monomer of 8 or 12 carbon atoms having one or more non-conjugated double bonds in the ring with the aid of a catalyst consisting of tungsten hexachloride and a cocatalyst, the improvement which comprises employing cis,trans-1,5-cyclodecadiene as the cocatalyst in a molar ratio to tungsten hexachloride of at least 2 : 1.

DETAILED DISCUSSION

It has now been found that cycloolefins of 8 or 12 carbon atoms and with one or more non-conjugated double bonds in the ring can be polymerized, optionally in the presence of a solvent, with the aid of a catalyst of tungsten hexachloride and cis,trans-1,5-cyclodecadiene as the cocataylst. This is surprising insofar as it is known from the literature, e.g., J. Polym. Sci. [B] 11 : 263 (1973), that cis,trans-1,5-cyclodecadiene cannot be polymerized at a temperature of 30° C. under the effect of tungsten hexachloride.

Cycloolefins of 8 or 12 carbon atoms and with one or more non-conjugated double bonds in the ring are preferably the hydrocarbons cis-cyclooctene, cis,cis-1,5-cyclooctadiene, cyclododecene (pure or as a mixture of isomers) and cic,trans,trans-1,5,9-cyclododecatriene. The cycloolefins can be polymerized individually to form homopolymers or with one another to form random, block or graft copolymers. cis,cis-1,5-Cyclooctadiene and cis,trans,trans-1,5,9-cyclododecatriene are obtainable by the catalytic cyclodimerization and/or cyclotrimerization of butadiene described in "Liebigs Ann. Chem." (Liebigs Annals of Chemistry) 727 : 143 (1969). From these compounds, cis-cyclooctene and the isomer mixture of cyclododecene can be prepared by partial hydrogenation, e.g. in accordance with the process of German Pat. No. 1,277,852.

The process of this invention can be accomplished with or without inert solvents or diluents which do not deleteriously affect the course of the reaction, e.g., aliphatic alicyclic, aromatic and halogenated hydrocarbons which include but are not limited to pentane, hexane, heptane, n- and isooctane, isononane (hydrogenated trimer propene), n-decane, isododecane (hydrogenated tetramer propene); cyclopentane, cyclohexane, methylcyclopentane, methylcyclohexane, ethylcyclohexane, isopropylcyclohexane, cyclooctane, decahydronaphthalene; hydrogenated terpenes, such as pinane and camphane; cyclohexene and it substitution products; benzene, toluene, o-, m-, p-xylene, ethylbenzene, o-, m-, p-diethylbenzene, n-propylbenzene, isopropylbenzene and other mono- to polyalkylbenzenes; tetrahydronaphthalene; methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene and 1,2-dichloroethane, either singly or in admixtures of two or more.

It is essential that the solvents, as well as the reactants, be employed substantially free of water and other H-acidic compounds, as well as compounds having an electron donor function (Lewis bases) and peroxides.

Except for very small quantities which may be added to attain specific effects, such impurities generally impair the activity of the catalyst.

The cis,trans-1,5-cyclodecadiene utilized as the cocatalyst together with the commercially available tungsten hexachloride is obtainable in a simple manner by co-ligomerization of 2 moles of 1,3-butadiene with one mole of ethylene in accordance with methods known in the art, e.g., "Angew. Chem." (Applied Chemistry) 75 : 10 (1963) and "Liebigs Ann. Chem." 727 : 183 (1969).

Just as with the reactants and the solvents when used, the cocatalyst must likewise be free of water and other H-acidic compounds, as well as of compounds having donor functions and peroxides. This can be attained by methods known in the art, e.g., by percolating the cis,-trans-1,5-cyclodecadiene, immediately prior to use, over aluminum oxide under dry inert gas.

The molar ratio of the monomeric cycloolefins of 8 or 12 carbon atoms to the tungsten hexachloride catalyst in the present process is generally between 50 and 10,000, preferably between 500 and 2,500, and especially between 1,000 and 2,000. The lower limit of the molar ratio is determined by the known Friedel-Crafts activity of tungsten hexachloride, which can lead to undesirable by-products, while the upper limit is fixed by the possible inactivation of the catalyst system by impurities.

The molar ratio of cis,trans-1,5-cyclodecadiene to tungsten hexachloride must be at least 2 : 1 in the process of this invention. Specifically, this ratio is preferably during the polymerization of cis-cyclooctene, 20–60 : 1, during the polymerization of cis,cis-1,5-cyclooctadiene, 5-30 : 1; during the polymerization of cyclododecene, 20-250 : 1; and during the polymerization of cis,-trans,trans-1,5,9-cyclododecatriene, 10-70 : 1.

The process of this invention can be conducted discontinuously as well as continuously at temperatures of −20° to +80° C., preferably +10° to +40° C. under pressures sufficient to maintain the reaction mixture in the liquid phase. In general, the polymerization is effected by providing the cycloolefin or cycloolefins to be polymerized, optionally together with a solvent or solvent mixture, and subsequently first adding a solution of tungsten hexachloride in a suitable solvent, e.g. benzene, and thereafter the cocatalyst, if desired together with a diluent. The sequence of adding the catalyst components is not critical, but it is recommended in cases of low monomer : tungsten hexachloride ratios to first add the cocatalyst. The molecular weight of the polyalkenamers producible in accordance with this invention can be optionally controlled by adding suitable compounds, e.g. acyclic alkenes with one or more non-conjugated double bonds, which can be terminal- or interiorly positioned and which should not carry any substituents. Such compounds include but are not limited to 1-pentene, 1-hexene, 1-heptene, 1-octene, 2-pentene and 7-tetradecene. The addition of the controlling compound should be effected if at all possible prior to the addition of the second catalyst component, but at the latest sufficiently well before the inactivation of the catalyst so athat the intended regulation of the molecular weight still occurs.

The polymrization is terminated after the desired reaction time by inactivating the catayst, e.g., by adding an H-acidic compound. Thereafter, the polyalkenamers are isolated and purified in a conventional manner. If the polyalkenamers are obtained in a solution or in the liquid phase, the catalyst residues are removed after stopping the polymerization, e.g. by washing out the polymer-containing phase with an aqueous or aqueous-alcoholic solution of agents having a dissolving effect on the catalyst residues which initially are present as compounds of the H-acidic materials. Such compounds having a dissolving effect are, for example, acids, bases or complexing agents, e.g. acetylacetone, citric or tartaric acid, ethylenediaminetetraacetic acid, nitrilotriacetic acid, etc. Thereafter, the polymers are separated by precipitation (e.g. pouring into a precipitant, such as methanol, isopropanol or acetone) or by removing the solvent by distillation (e.g. by blowing steam into the polymer solution or by introducing the latter through nozzles into hot water). If the polymers are precipitated from the solution of the monomer in the form of flakes or in powdery form, they can also be separated from the liquid by filtraton, centrifugation or decantation and then they can be subjected to the treatment for the removal of the catalyst residues. To protect against oxidaton, gelling and other aging phenomena, it is possible to admix stabilizers with the polyalkenamers in various stages of the working-up operation, e.g. aromatic amines or sterically hindered phenols. Likewise, further purification can be conducted by a reprecipitation of the polymer, if this should prove necessary. After these steps, the polymer is dried in a conventional manner.

The polyalkenamers which can be produced according to the process of this invention are suitable, for example, in the low-molecular weight range, optionally after additional reactions, as binders for coating compounds and, in the high-molecular weight range, predominantly as a raw material for the production of elastomeric or thermoplastic molded components. The specific purpose for which they are used depends on the type of the monomer, the molecular weight, and the proportion of cis- and trans-double bonds in the polyalkenamers, as is known in the art.

The following examples serve for an additional explanation of the invention. The reduced specific viscosity (RSV) was measured in all cases at 135° C. in decahydronaphthalene. To determine the cis-trans-C=C ratio, the absorption band at 730 cm$^{-1}$ in the infrared spectra of the polymers was evaluated.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

In a dry three-necked flask, 1.5 ml. of a 0.1-molar solution of tungsten hexachloride in benzene was added under agitation to a mixture, cooled to 0° C., made up of 30 ml. (245 millimoles) of cis,cis-1,5-cyclooctadiene and the amount of cocatalyst (cis,trans-1,5-cyclodecadiene) indicated in Table I. Any peroxides and traces of moisture present therein were removed prior to use from the alkenes employed as the monomer or the cocatalyst by percolation over aluminum oxide. Thereafter, the content of the flask was heated to the desired reaction temperature of 20° C. The polymerizations, recognizable from a rise in viscosity, were interrupted at the latest upon the arrest of the agitator by adding 2 ml. of a 5% alkaline solution of 2,6-di-tert.-butyl-p-cresol ("Ionol") in isopropanol. The polymers, precipitated with an excess of isopropanol, were subsequently extracted by boiling with fresh isopropanol for about 90 minutes, dried until a constant weight was attained, and analyzed. The results of Experiments 1–6 as well as of Comparative Example A are compiled in Table I.

TABLE I

| Experiment No. | Cocatalyst (ml.) | Molar Ratio Cocatalyst/WCl$_6$ | Molar Ratio Monomer/WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| A | — | — | 1645 | 20 | 120 | — | — | — | — |
| 1 | 0.05 | 2.2 | 1645 | 20 | 45 | 0.1 | 0.4 | + | 90 |
| 2 | 0.1 | 4.4 | 1645 | 20 | 50 | 8.9 | 33.4 | 1.0 | 91 |
| 3 | 0.15 | 6.6 | 1645 | 20 | 8 | 5.0 | 18.8 | 0.8 | 89 |
| 4 | 0.25 | 11 | 1645 | 20 | 6 | 9.9 | 37.2 | 1.2 | 87 |
| 5 | 0.5 | 22 | 1645 | 20 | 3 | 24.4 | 91.6 | 0.2 | 84 |
| 6 | 1.0 | 44 | 1645 | 20 | 45 | 2.1 | 7.9 | 0.43 | 85 |

+ This value was not determined.

EXAMPLE 2

Experiment No. 4 from Table I was repeated with the difference that, instead of 30 ml., 180 ml. of cis,cis-1,5-cyclooctadiene was polymerized at 20° C. with 0.15 mmol. of tungsten hexachloride and 0.25 ml. of cis,-trans-1,5-cyclodecadiene. The molar ratio of the monomer to tungsten hexachloride was, therefore, about 9,800 : 1. After a reaction time of 60 minutes, 69 g. ≃ 43% of theory of a polymer was obtained having an RSV value of 0.35 dl./g. and a proportion of 90% cis-C=C-double bonds.

EXAMPLE 3

Experiment No. 4 from Table I was repeated except that, in addition to the monomer, respectively 30 ml. of the solvents were admixed as indicated in Table II, and the polymerizations were terminated after the reaction times set forth therein. The results of Experiments 8–11 are compiled in Table II. In all experiments, the catalyst was made up of 0.15 mmol. of tungsten hexachloride and 0.25 ml. (1.65 mmol.) of cocatalyst, i.e. the molar ratio was 11 : 1. The molar ratio of cis,cis-1,5-cyclooctadiene to tungsten hexachloride was always 1,645 : 1 and the reaction temperature was 20° C.

TABLE II

| Experiment No. | Solvent | Reaction Time (min.) | Yield of Polymer (g.) | Yield of Polymer (% of Theory) | RSV (dl./g.) | IR (% cis-C=C) |
|---|---|---|---|---|---|---|
| 8 | Hexane | 80 | 18.0 | 67.6 | 1.25 | 86 |
| 9 | Benzene | 8 | 8.9 | 33.4 | 1.23 | 87 |
| 10 | Toluene | 25 | 4.8 | 18.0 | 1.19 | 87 |
| 11 | Chlorobenzene | 70 | 6.0 | 22.5 | 1.56 | 88 |

EXAMPLE 4

Using the mode of operation described in Example 1, 30 ml. of cis,cis-1,5-cyclooctadiene was polymerized with the addition of various amounts of 1-octene for molecular weight control and with 0.15 mmol. of tungsten hexachloride and varying amounts of cocatalyst. The results of Experiments 12–23 are set forth in Table III.

TABLE III

| Experiment No. | Cocatalyst (ml.) | Molar Ratio Cocatalyst/WCl$_6$ | 1-Octene (ml.) | Reaction Temp. (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 12 | 0.25 | 11 | 0.03 | 20 | 9 | 18.7 | 70.2 | 1.82 | 90 |
| 13 | 0.25 | 11 | 0.06 | 20 | 9 | 4.3 | 16.1 | 1.43 | 90 |
| 14 | 0.25 | 11 | 0.12 | 20 | 10 | 4.7 | 17.6 | 1.16 | 90 |
| 15 | 0.5 | 22 | 0.03 | 20 | 50 | 1.8 | 6.8 | 0.63 | 86 |
| 16 | 0.5 | 22 | 0.12 | 20 | 50 | 1.0 | 3.8 | 0.38 | 86 |
| 17 | 0.25 | 11 | — | 20 | 14 | 12.4 | 46.6 | insol. | 90 |
| 18 | 0.25 | 11 | 0.15 | 20 | 15 | 5.8 | 21.8 | 1.09 | 91 |
| 19 | 0.25 | 11 | 0.15 | 20 | 30 | 4.5 | 16.9 | 1.04 | 91 |
| 20 | 0.5 | 22 | — | 0 | 10 | 17.8 | 66.9 | insol. | 71 |
| 21 | 0.25 | 11 | 0.12 | 25 | 27 | 7.8 | 29.3 | 1.28 | 91 |
| 22 | 0.25 | 11 | 0.12 | 50 | 27 | 5.0 | 18.8 | 0.73 | 90 |
| 23 | 0.25 | 11 | 0.12 | 80 | 27 | 0.8 | 3.0 | 0.67 | 93 |

EXAMPLE 5

Following the operation described in Example 1, 30 ml. (230 mmol.) of cis-cyclooctene was polymerized with a catalyst of varying amounts of cis,trans-1,5-cyclodecadiene and 1.5 ml. of an 0.1-molar solution of tungsten hexachloride in benzene. The results of Experiments 24–30 are complied in Table IV.

TABLE IV

| Experiment No. | Cocatalyst (ml.) | Molar Ratio Cocatalyst/WCl$_6$ | Molar Ratio Monomer/WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 24 | 0.5 | 22 | 1540 | 20 | 120 | 0.5 | 2.0 | 0.40 | 82 |
| 25 | 1.0 | 44 | 1540 | 20 | 120 | 4.0 | 15.8 | 0.48 | 69 |
| 26 | 1.5 | 66 | 1540 | 20 | 120 | 2.5 | 9.9 | 0.40 | 81 |
| 27 | 1.5 | 66 | 1540 | 0 | 120 | 0.9 | 3.5 | 0.20 | 81 |
| 28 | 1.5 | 66 | 1540 | 25 | 120 | 2.9 | 11.4 | 0.28 | 84 |
| 29 | 1.5 | 66 | 1540 | 50 | 120 | 1.4 | 5.5 | 0.21 | 81 |

TABLE IV-continued

| Experiment No. | Cocatalyst (ml.) | Molar Ratio Cocatalyst/WCl$_6$ | Molar Ratio Monomer/WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 30 | 1.5 | 66 | 1540 | 80 | 120 | 0.2 | 0.8 | 0.30 | 79 |

EXAMPLE 6

Using the mode of operation set forth in Example 1—except for Experiment 31, wherein 15 ml. of monomer was employed—30 ml. (158 mmol.) of cyclododecene (mixture of isomers with 70.3% trans- and 29.7% cis-cyclododecene) was polymerized with a catalyst of varying amounts of cis,trans-1,5-cyclodecadiene and 1.5 ml. of a 0.1-molar solution of tungsten hexachloride in benzene. The results of Comparative Experiment B, as well as Experiments 31-38, are indicated in Table V.

EXAMPLE 7

Following the steps described in Example 1, varying amounts of cyclododecene (mixtures of isomers as in Example 6) were polymerized with a catalyst of 1.5 ml. of a 0.1 molar solution of tungsten hexachloride in benzene and varying amounts of cis,trans-1,5-cyclodecadiene at the indicated temperatures. The results of Experiments 39-45 are compiled in Table VI.

TABLE V

| Experiment No. | Cocatalyst (ml.) | Molar Ratio Cocatalyst/WCl$_6$ | Molar Ratio Monomer/WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| B | — | — | 1050 | 20 | 120 | — | — | — | — |
| 31* | 0.12 | 5.3 | 525* | 20 | 300 | 0.2 | 0.8 | + | + |
| 32 | 0.25 | 11 | 1050 | 20 | 100 | 0.8 | 3.1 | 0.27 | 46 |
| 33 | 0.5 | 22 | 1050 | 20 | 35 | 4.8 | 18.3 | 0.78 | 60 |
| 34 | 1.0 | 44 | 1050 | 20 | 17 | 10.7 | 40.8 | 0.76 | 53 |
| 35 | 1.5 | 66 | 1050 | 20 | 15 | 10.9 | 41.6 | 0.67 | 50 |
| 36 | 2.0 | 88 | 1050 | 20 | 14 | 14.6 | 55.7 | 0.68 | 49 |
| 37 | 5.0 | 220 | 1050 | 20 | 120 | 6.9 | 26.3 | 0.40 | 46 |
| 38 | 10.0 | 440 | 1050 | 20 | 120 | 4.8 | 18.3 | 0.19 | 45 |

*15 ml. of cyclododecene
+ Values not determined

TABLE VI

| Experiment No. | Cocatalyst (ml.) | Monomer (ml.) | Molar Ratio Monomer/WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 39 | 1.5 | 60 | 2,100 | 20 | 48 | 16.3 | 31.1 | 0.65 | 45 |
| 40 | 1.5 | 150 | 5,250 | 20 | 90 | 30.1 | 23.0 | 1.05 | 52 |
| 41 | 1.5 | 225 | 7,900 | 20 | 180 | 57.2 | 29.1 | 0.67 | 59 |
| 42 | 1.5 | 300 | 10,500 | 20 | 360 | 14.5 | 5.5 | 0.98 | 50 |
| 43 | 1.0 | 30 | 1,050 | 25 | 15 | 12.1 | 46.2 | 0.95 | 42 |
| 44 | 1.0 | 30 | 1,050 | 50 | 15 | 9.8 | 37.4 | 0.66 | 48 |
| 45 | 1.0 | 30 | 1,050 | 80 | 15 | 4.7 | 17.9 | 0.48 | 48 |

EXAMPLE 8

Employing the procedure disclosed in Example 1, 30 ml. of cyclododecene (mixture of isomers as indicated in Example 6) was polymerized with a catalyst of 1.5 ml. of a 0.1 molar solution of tungsten hexachloride in benzene and 1.0 ml. of cis,trans-1,5-cyclodecadiene with the addition of the amounts of 1-octene disclosed in Experiments 46-48 as the molecular weight regulator and/or with the addition of the quantities of solvent indicated in Experiments 49-51, at 20° C. The results are set forth in Table VII (Experiments 46-48) and in Table VIII (Experiments 49-51).

TABLE VII

| Experiment No. | Cocatalyst (ml.) | Molar Ratio Cocatalyst/WCl$_6$ | Molecular Weight Regulator (ml. 1-Octene) | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 46 | 1.0 | 44 | — | 20 | 18 | 9.9 | 37.8 | 0.56 | 47 |
| 47 | 1.0 | 44 | 0.05 | 20 | 23 | 9.1 | 34.7 | 0.38 | 48 |
| 48 | 1.0 | 44 | 0.10 | 20 | 23 | 5.5 | 21.0 | 0.33 | 52 |

TABLE VIII

| Experiment No. | Cocatalyst (ml.) | Molar Ratio Cocatalyst/WCl$_6$ | Solvent (ml.) | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 49 | 1.0 | 44 | 15 Cyclohexane | 20 | 78 | 3.3 | 12.6 | 0.65 | 45 |

TABLE VIII-continued

| Experiment No. | Cocatalyst (ml.) | Molar Ratio Cocatalyst/ WCl$_6$ | Solvent (ml.) | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| 50 | 1.0 | 44 | 15 Benzene | 20 | 78 | 3.4 | 13.0 | 0.44 | 46 |
| 51 | 1.0 | 44 | 15 Hexane | 20 | 78 | 14.3 | 54.6 | 0.92 | 44 |

EXAMPLE 9

Analogously to the method described in Example 1, 30 ml. (165 mmol.) of cis,trans,trans-1,5,9-cyclodecatriene—except for Experiments 52, 53 and 63, wherein 15 ml. was utilized—was polymerized with a catalyst of varying amounts of cis,trans-1,5-cyclodecadiene and 1.5 ml. of a 0.1 molar solution of tungsten hexachloride in benzene. The results of Comparative Experiment C, as well as Experiments 52-63, are compiled in Table IX.

TABLE IX

| Experiment No. | Cocatalyst (ml.) | Molar Ratio Cocatalyst/ WCl$_6$ | Molar Ratio Monomer/ WCl$_6$ | Reaction Temperature (° C.) | Reaction Time (min.) | Yield of Polymer (g.) | Yield of Polymer (% of Theory) | RSV (dl./g.) | IR (% cis-C=C) |
|---|---|---|---|---|---|---|---|---|---|
| C | — | — | 1,100 | 20 | 90 | — | — | — | — |
| 52* | 0.09 | 4.0 | 550 | 20 | 180 | 0.2 | 0.8 | + | + |
| 53* | 0.12 | 5.3 | 550 | 20 | 180 | 0.5 | 1.9 | 0.29 | 40 |
| 54 | 0.25 | 11 | 1,100 | 20 | 75 | 5.9 | 22.1 | 0.35 | 53 |
| 55 | 0.5 | 22 | 1,100 | 20 | 48 | 7.1 | 26.5 | 0.40 | 39 |
| 56 | 1.0 | 44 | 1,100 | 20 | 45 | 6.0 | 22.4 | 0.28 | 29 |
| 57 | 1.5 | 66 | 1,100 | 20 | 45 | 5.9 | 22.1 | 0.21 | 57 |
| 58 | 2.0 | 88 | 1,100 | 20 | 180 | 4.2 | 15.7 | 0.16 | 34 |
| 59 | 3.0 | 132 | 1,100 | 20 | 180 | 4.1 | 14.9 | 0.18 | 36 |
| 60 | 0.5 | 22 | 1,100 | 0 | 45 | 4.6 | 17.2 | 0.40 | 37 |
| 61 | 0.5 | 22 | 1,100 | 25 | 45 | 4.8 | 17.8 | 0.26 | 41 |
| 62 | 0.5 | 22 | 1,100 | 50 | 45 | 1.4 | 5.2 | 0.32 | 36 |
| 63* | 0.5 | 22 | 550 | 80 | 45 | 0.3 | 1.1 | 0.45 | 36 |

*15 ml. of cis,trans,trans-1,5,9-cyclododecatriene
+ Value was not determined

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the polymerization of a cycloolefin monomer of 8 or 12 carbon atoms having one or more non-conjugated double bonds in the ring with the aid of a catalyst consisting of tungsten hexachloride and a cocatalyst, the improvement which comprises employing cis,-trans-1,5-cyclodecadiene as the cocatalyst in a molar ratio to tungsten hexachloride of at least 2 : 1.

2. A process according to claim 1, wherein the cycloolefin employed is cis-cyclooctene, cis,cis-1,5-cyclooctadiene, cyclododecene or cis,trans,trans-1,5,9-cyclododecatriene.

3. A process according to claim 2, wherein the cycloolefin is cis-cyclooctene and said molar ratio is 20-60 : 1.

4. A process according to claim 2, wherein the cycloolefin is cis,cis-1,5-cyclooctadiene and said molar ratio is 5-30 : 1.

5. A process according to claim 2, wherein the cycloolefin is cyclododecene and said molar ratio is 20-250 : 1.

6. A process according to claim 2, wherein the cycloolefin is cis,trans,trans-1,5,9-cyclododecatriene and said molar ratio is 10-70 : 1.

7. A process according to claim 1, wherein the molar ratio of cycloolefin to tungsten hexachloride is about 500-2,500 : 1.

8. A process according to claim 1, wherein the polymerization is conducted in an inert diluent.

9. A process according to claim 1, wherein polymerization is effected at a temperature of −20° to +80° C.

10. A process according to claim 9, wherein said temperature is 10°-40° C.

* * * * *